United States Patent
Tseng et al.

(10) Patent No.: US 10,693,313 B2
(45) Date of Patent: Jun. 23, 2020

(54) POWER APPARATUS OPERATING METHOD, POWER APPARATUS, AND POWER APPARATUS MANAGEMENT SYSTEM

(71) Applicant: Industrial Technology Research Institute, Hsinchu (TW)

(72) Inventors: Chung-Lin Tseng, Zhongli (TW); Horng-Jzer Shih, Kaohsiung (TW); Kai-Cheung Juang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 291 days.

(21) Appl. No.: 15/953,849

(22) Filed: Apr. 16, 2018

(65) Prior Publication Data

US 2019/0013693 A1 Jan. 10, 2019

(30) Foreign Application Priority Data

Jul. 7, 2017 (TW) .............................. 106122831 A

(51) Int. Cl.
*H02J 9/06* (2006.01)
*H02J 3/10* (2006.01)
(Continued)

(52) U.S. Cl.
CPC .................. *H02J 9/06* (2013.01); *H02J 1/04* (2013.01); *H02J 3/10* (2013.01); *H02J 7/0063* (2013.01); *H02J 2007/0067* (2013.01)

(58) Field of Classification Search
CPC ........ H02J 9/06; H02J 3/10; H02J 1/04; H02J 7/0063; H02J 2007/0067; H02J 7/36
See application file for complete search history.

(56) References Cited

U.S. PATENT DOCUMENTS 7,049,791 B2 * 5/2006 Lin ....................... H02J 7/0016
320/116
7,388,349 B2 6/2008 Elder et al.
(Continued)

FOREIGN PATENT DOCUMENTS

CN 101232193 A 7/2008
CN 102918742 A 2/2013
(Continued)

OTHER PUBLICATIONS

Extended European Search Report, dated Aug. 27, 2018, for European Application No. 18176448.1.
(Continued)

*Primary Examiner* — Pinping Sun
(74) *Attorney, Agent, or Firm* — Birch, Stewart, Kolasch & Birch, LLP

(57) ABSTRACT

In an embodiment, a power apparatus operating method includes receiving a mode switching signal to control an operating of a power apparatus to provide and/or receive a preconfigured load; sensing an enable route current of an enable route, and a bypass route current of a bypass route, wherein the enable route current flowing through a battery module including one or more batteries, and the bypass route current does not flowing through the battery module; and controlling driving a first and a second switches by using a negative feedback control and an open loop control, to perform a current switching between an enable mode and a bypass mode of the power apparatus, based on the mode switching signal, the enable route current and the bypass route current, wherein the enable mode uses the power apparatus and the bypass mode bypasses the power apparatus.

26 Claims, 7 Drawing Sheets

(51) Int. Cl.
*H02J 1/04* (2006.01)
*H02J 7/00* (2006.01)

(56) References Cited

U.S. PATENT DOCUMENTS

| | | | |
|---|---|---|---|
| 7,456,521 | B2 | 11/2008 | Weidenheimer et al. |
| 7,893,561 | B2 | 2/2011 | Weidenheimer et al. |
| 7,948,211 | B2 | 5/2011 | Gonzales et al. |
| 8,269,455 | B2 | 9/2012 | Marten |
| 8,427,106 | B2 | 4/2013 | Kim et al. |
| 8,470,464 | B2 | 6/2013 | Troutman |
| 8,816,613 | B2 | 8/2014 | Lee |
| 8,823,325 | B2 | 9/2014 | Ling et al. |
| 8,965,722 | B2 | 2/2015 | Yoshida et al. |
| 9,099,271 | B2 | 8/2015 | Constantin et al. |
| 9,774,194 | B2 * | 9/2017 | Fukuchi ............... H02J 7/0021 |
| 2004/0095081 | A1 * | 5/2004 | Kernahan ........ H05B 41/2827 315/307 |
| 2008/0180061 | A1 | 7/2008 | Koski et al. |
| 2009/0085553 | A1 | 4/2009 | Kumar et al. |
| 2009/0286149 | A1 | 11/2009 | Ci et al. |
| 2010/0188134 | A1 * | 7/2010 | Pidutti .................... H02M 1/32 327/427 |
| 2012/0086400 | A1 | 4/2012 | White et al. |
| 2012/0094150 | A1 | 4/2012 | Troutman |
| 2012/0206095 | A1 | 8/2012 | Marten |
| 2012/0256568 | A1 * | 10/2012 | Lee ........................... B60L 7/14 318/139 |
| 2012/0313560 | A1 | 12/2012 | Hambitzer et al. |
| 2012/0319658 | A1 | 12/2012 | White et al. |
| 2013/0127423 | A1 | 5/2013 | Liang et al. |
| 2013/0179103 | A1 * | 7/2013 | Luo ....................... G01R 31/389 702/63 |
| 2014/0042977 | A1 | 2/2014 | Kim |
| 2014/0157034 | A1 | 6/2014 | Chiueh et al. |
| 2014/0184166 | A1 * | 7/2014 | Ohkawa ................... B60L 3/12 320/134 |
| 2014/0184168 | A1 | 7/2014 | Park et al. |
| 2014/0306609 | A1 | 10/2014 | Kang et al. |
| 2014/0320067 | A1 | 10/2014 | Ling et al. |
| 2015/0008886 | A1 | 1/2015 | Kim |
| 2015/0022160 | A1 | 1/2015 | Greening et al. |
| 2015/0028817 | A1 | 1/2015 | Brockerhoff |
| 2015/0048853 | A1 | 2/2015 | Gong et al. |
| 2015/0115736 | A1 * | 4/2015 | Snyder .................. H02J 7/0016 307/115 |
| 2016/0118789 | A1 | 4/2016 | Fornage |
| 2016/0164315 | A1 | 6/2016 | Hsu et al. |
| 2016/0241026 | A1 | 8/2016 | Pehlke |
| 2017/0005497 | A1 | 1/2017 | Sherstyuk et al. |
| 2017/0005503 | A1 | 1/2017 | Kogler et al. |
| 2017/0133865 | A1 * | 5/2017 | Chiueh ................. H02J 7/0068 |

FOREIGN PATENT DOCUMENTS

| | | |
|---|---|---|
| CN | 102934316 A | 2/2013 |
| JP | 2013-507895 A | 3/2013 |
| JP | 2013-74690 A | 4/2013 |
| TW | 200849766 A | 12/2008 |
| TW | 200913433 A | 3/2009 |
| TW | 201213178 A1 | 4/2012 |
| TW | 201318302 A1 | 5/2013 |
| TW | 201401712 A | 1/2014 |
| TW | 201414135 A | 4/2014 |
| TW | I492480 B | 7/2015 |
| TW | 201611467 A | 3/2016 |
| TW | M521294 U | 5/2016 |
| TW | 201644143 A | 12/2016 |
| TW | I568122 B | 1/2017 |
| WO | WO 2014/143444 A1 | 9/2014 |

OTHER PUBLICATIONS

Japanese Office Action, dated Jun. 11, 2019, for Japanese Application No. 2018-128570, with an English translation.

Baronti et al., "Design of a Module Switch for Battery Pack Reconfiguration in High-Power Applications," 2012 IEEE International Symposium on Industrial Electronics (ISIE), May 28-31, 2012, pp. 1330-1335.

Cao et al., "Battery Balancing Methods: A Comprehensive Review," IEEE Vehicle Power and Propulsion Conference (VPPC), Sep. 3-5, 2008, 6 pages.

Ci et al., "Dynamic Reconfigurable Multi-Cell Battery: A Novel Approach to Improve Battery Performance," 2012 27th Annual IEEE Applied Power Electronics Conference and Exposition (APEC), Feb. 5-9, 2012, pp. 439-442.

Daowd et al., "Passive and Active Battery Balancing Comparison Based on MATLAB Simulation," 2011 IEEE Vehicle Power and Propulsion Conference (VPPC), Sep. 6-9, 2011, 7 pages.

He et al., "Exploring Adaptive Reconfiguration to Optimize Energy Efficiency in Large-Scale Battery Systems," 2013 IEEE 34th Real-Time Systems Symposium, 2013, pp. 118-127.

Jiang et al., "Active Current Sharing and Source Management in Fuel Cell-Battery Hybrid Power System," IEEE Transactions on Industrial Electronics, vol. 57, No. 2, Feb. 2010, pp. 752-761.

Kim et al., "Scheduling of Battery Charge, Discharge, and Rest," 2009 30th IEEE Real-Time Systems Symposium, 2009, pp. 13-22.

Kim et al., "Series-Connected Self-Reconfigurable Multicell Battery," 2012 27th Annual IEEE Applied Power Electronics Conference and Exposition (APEC), Feb. 5-9, 2012, pp. 1382-1387.

Steinhorst et al., "Distributed Reconfigurable Battery System Management Architectures," 2016 21st Asia and South Pacific Design Automation Conference (ASP-DAC), Jan. 25-28, 2016, pp. 429-434.

Visairo et al., "A Reconfigurable Battery Pack for Improving Power Conversion Efficiency in Portable Devices," Proceedings of the 7th International Caribbean Conference on Devices, Circuits and Systems, Apr. 28-30, 2008, 6 pages total.

Wey et al., "A Unitized Charging and Discharging Smart Battery Management System," 2013 International Conference on Connected Vehicles and Expo (ICCVE), 2013, pp. 903-909.

Zhao et al., "Reconfigurable Solar Photovoltaic Battery Charger Using a Switch Matrix," 2012 34th IEEE International Telecommunications Energy Conference (INTELEC), Sep. 30-Oct. 4, 2012, 7 pages.

\* cited by examiner subtracting the bypass route current from the power apparatus load current to form the feedback control signal, if the mode switch signal indicates switching from the enable mode to the bypass mode;

and subtracting the enable route current from the power apparatus load current to form the feedback control signal, if the mode switch signal indicates switching from the bypass mode to the enable mode

POWER APPARATUS OPERATING METHOD, POWER APPARATUS, AND POWER APPARATUS MANAGEMENT SYSTEM

CROSS REFERENCE TO RELATED APPLICATIONS

The present application is based on, and claims priority from, Taiwan Application Serial Number 106122831, filed on Jul. 7, 2017, the disclosure of which is hereby incorporated by reference herein in its entirety

TECHNICAL FIELD

The technical field relates to a power apparatus operating method, a power apparatus and a power apparatus management system.

BACKGROUND

Nowadays the trend of environmental protection and energy conservation makes the green energy industry, especially the electric vehicle industry continues to flourish. The demand of the power module(s) in the electric vehicle is enormous, of course, in use of the operation of power system must be safe. The reconfiguration of the power supply array, according to the condition of the application and the control of the system, is achieved by the physical switch to connect the power devices in series and parallel, to fulfill the needs for the actual system environment.

In general when reconfiguring the power supply modules, which has to be operated under the condition that the system load doesn't directly charge or discharge the power supply modules (that is, in the situation of "zero current" operation). Obviously it's very inconvenient that the reconfigurable power system is under the condition of dynamics loading, for example, driving electric vehicle on the roads. As mentioned above, for the safety reason, when switching the power switch to reconfigure the power system, it usually needs to break the connection between the system load and the power device first. A [dead-time] control strategy is necessary. Firstly turn the enable (or bypass) switch that previously on from on status to off, and then turn the bypass (or enable) switch that previously off from off status to on. This may prevent the shoot-through current being generated, and the power supply array can thus be switched or reconfigured. To be safe and sound, the power system needs an additional energy storage unit to help fulfill energy demand of the system load when reconfiguring the power device or power modules. This may lower the power transfer efficiency. In reality, it's not easy to reconfigure the power or battery modules during the long-term uninterrupted dynamic load requirements for driving the electric vehicle on the road.

Therefore, it is one of the recent rise research topic on how to solve the practical issues when using the power device or not (that is, turn on/off the enable/bypass switch), and reconfiguring the serial-parallel reassembly of the power device can be carried out easily under various dynamic loads as time goes by.

SUMMARY

In an exemplary embodiment in accordance with the application, a power apparatus management system is provided. The system comprises at least one control module configured to transmit at least one control signal to manage operations of at least one of one or more power apparatuses, and a power apparatus module configured to provide and/or receive a preconfigured load of a preconfigured device. The power apparatus module including the one or more power apparatuses, with each power apparatus comprises: a positive terminal and a negative terminal; a battery module comprising one or more batteries, and configured to electrically couple to the negative terminal; a battery module controller configured to electrically couple to the battery module; a first switch and a second switch, wherein each of the first switch and the second switch has a first end, a second end and a third end, with the first end and the second end be respectively electrically coupled to the battery module controller and the positive terminal. The third end of the first switch electrically coupled to the battery module, and the third end of the second switch electrically coupled to the negative terminal. Wherein between the positive and the negative terminals, there are an enable route flowing through the battery module and a bypass route not flowing through the battery module, and the battery module controller is configured to: sense an enable route current flowing through the enable route and a bypass route current flowing through the bypass route; and control a driving of the first switch and a driving of the second switch by using a negative feedback control and an open loop control, to perform a current switching between an enable mode and a bypass mode of the at least one of the one or more power apparatuses, based on a mode switching signal of said at least one control signal that received, the enable route current and the bypass route current, wherein the enable mode uses the at least one of the one or more power apparatuses and the bypass mode bypasses the at least one of the one or more power apparatuses.

In another exemplary embodiment in accordance with the application, a power apparatus is provided. The power apparatus is configured to provide and/or receive a preconfigured load and comprises a positive terminal, a negative terminal, a battery module, a battery module controller, a first switch and a second switch. The battery module comprises one or more batteries and is configured to electrically couple to the negative terminal. The battery module controller is configured to electrically couple to the battery module. Each of the first and the second switches has a first end, a second end and a third end with the first end and the second end be respectively electrically coupled to the battery module controller and the positive terminal The third end of the first switch electrically coupled to the battery module, and the third end of the second switch electrically coupled to the negative terminal. Wherein between the positive and the negative terminals, there are an enable route flowing through the battery module and a bypass route not flowing through the battery module, and the battery module controller is configured to: sense an enable route current flowing through the enable route and a bypass route current flowing through the bypass route; and control a driving of the first switch and a driving of the second switch by using a negative feedback control and an open loop control, to perform a current switching between an enable mode and a bypass mode of the power apparatus, based on a mode switching signal that received, the enable route current and the bypass route current, wherein the enable mode uses the power apparatus and the bypass mode bypasses the power apparatus.

In another exemplary embodiment in accordance with the application, a power apparatus operating method is provided. The power apparatus operating method includes:

receiving a mode switching signal to control an operating of a power apparatus to provide and/or receive a preconfigured load; sensing an enable route current of an enable route, and a bypass route current of a bypass route, wherein the enable route current flows through a battery module including one or more batteries, and the bypass route current does not flow through the battery module; and controlling a driving of a first switch and a driving of a second switch by using a negative feedback control and an open loop control, to perform a current switching between an enable mode and a bypass mode of the power apparatus, based on the mode switching signal, the enable route current and the bypass route current, wherein the enable mode uses the power apparatus and the bypass mode bypasses the power apparatus.

The application will become more fully understood by referring to the following detailed description with reference to the accompanying drawings.

BRIEF DESCRIPTION OF THE DRAWINGS

FIGS. 5-7 show flowcharts of a power apparatus operating method according to embodiments of the application.

DETAILED DESCRIPTION OF EMBODIMENTS

Figure 1:
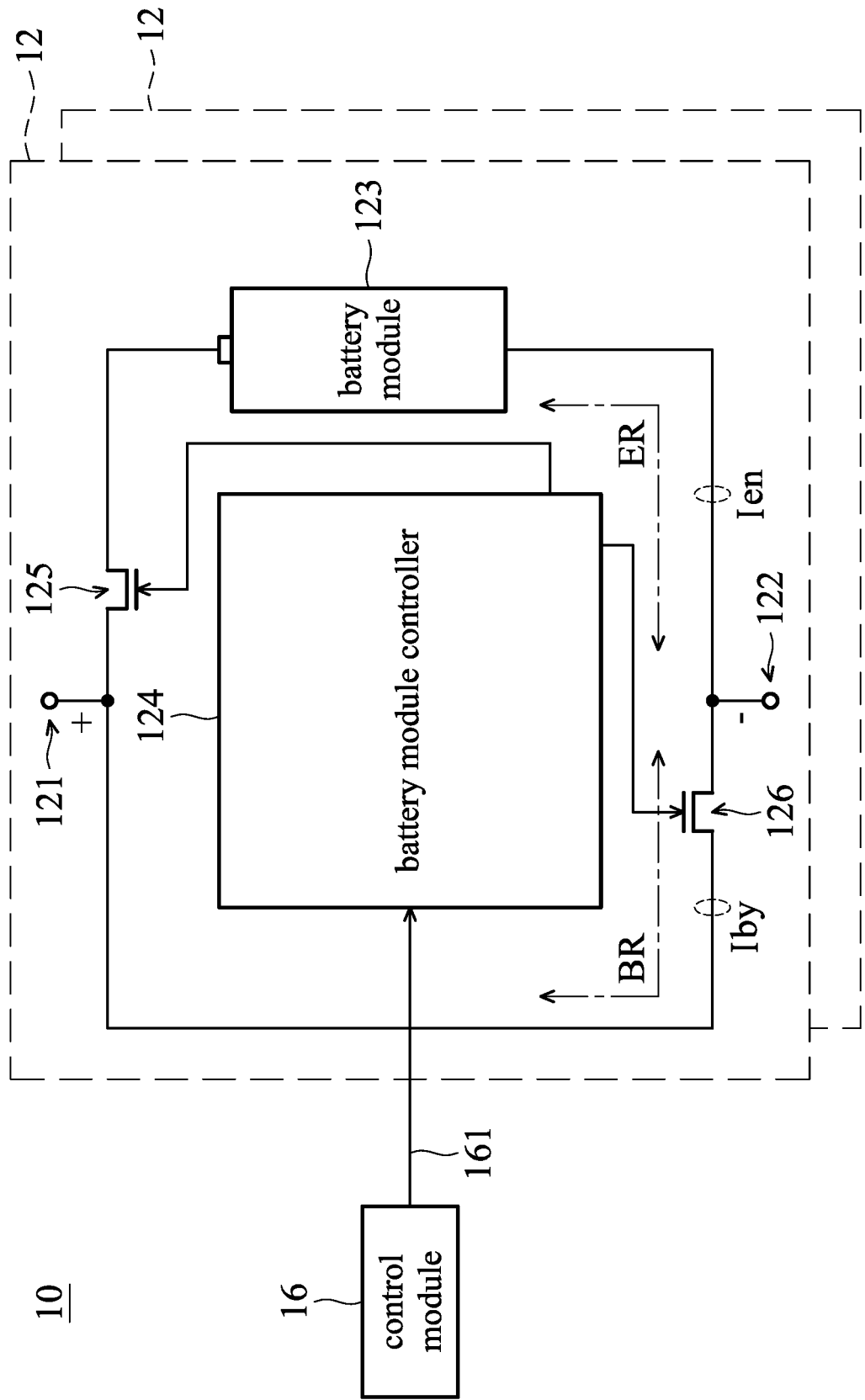
FIG. 1 shows a schematic diagram of a power apparatus management system according to an embodiment of the application.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 2:
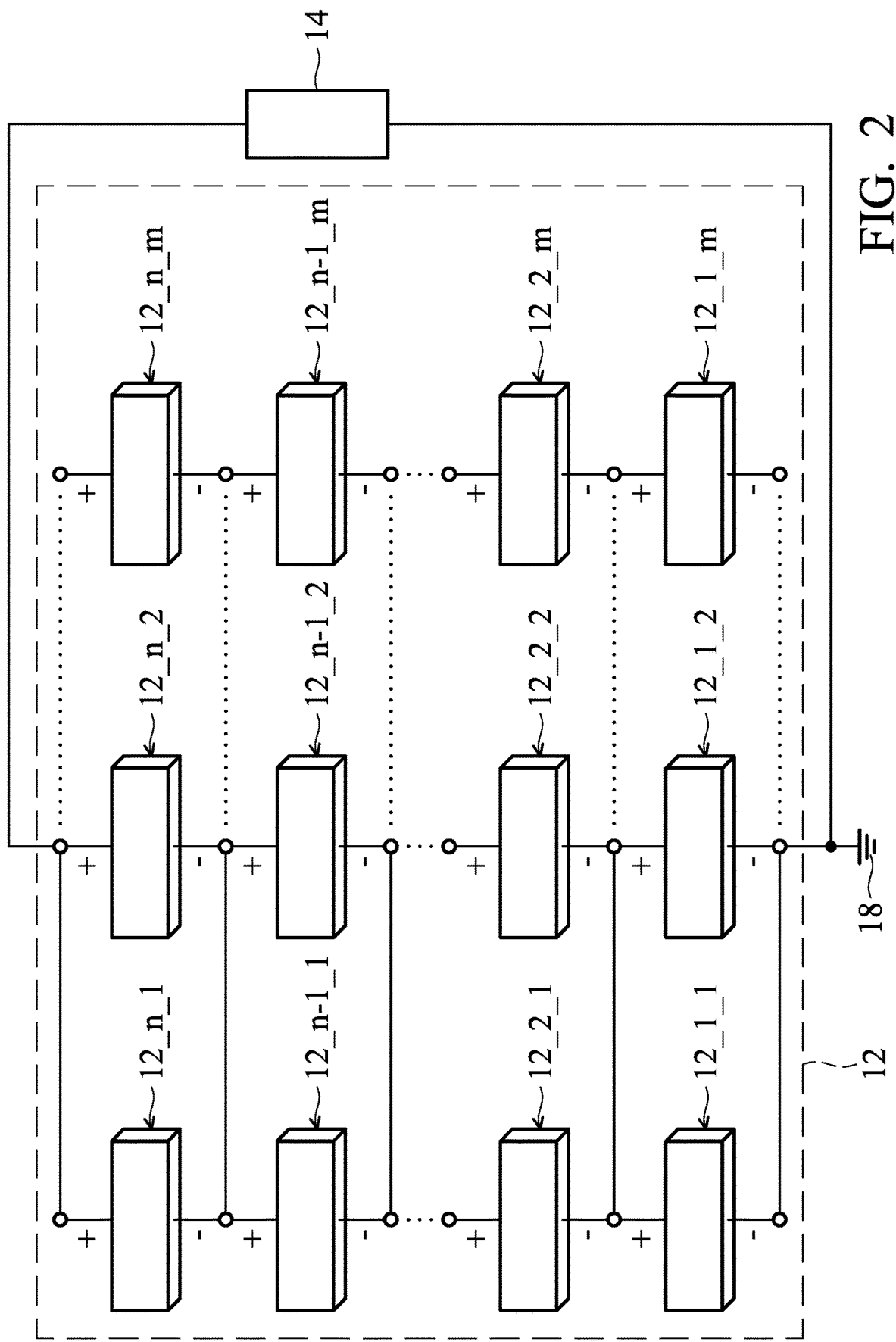
FIG. 2 shows a schematic diagram of a power apparatus module according to an embodiment of the application.
Figure 3:
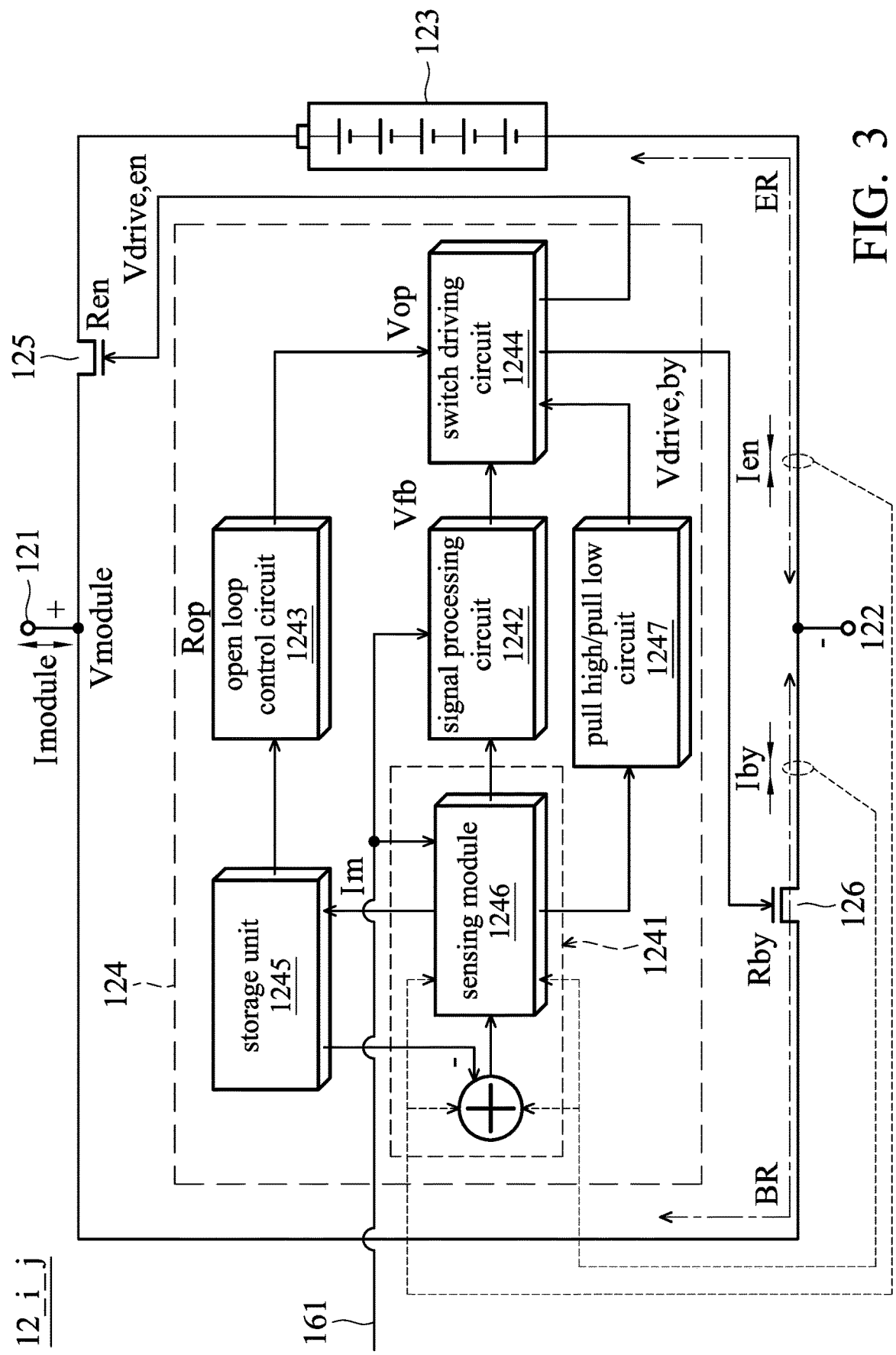
FIG. 3 shows a schematic diagram of a power apparatus according to an embodiment of the application.

FIG. 1 shows a schematic diagram of a power apparatus management system 10 in accordance with an embodiment of the application. FIG. 2 shows a schematic diagram of a power apparatus module 12 in accordance with an embodiment of the application, and FIG. 3 shows a schematic diagram of a power apparatus 12_i_j in accordance with an embodiment of the application. Referring to FIG. 1 and FIG. 2, the power apparatus management system 10 includes a power apparatus module 12. As shown in the embodiment of FIG. 2, the power apparatus module 12 includes one or more power apparatuses 12_i_j, i=1, ..., n, j=1, ..., m, where both n and m are positive integers greater than or equal to 1. The power apparatus module 12 is configured to provide a preconfigured load to a preconfigured device 14 and/or receive a preconfigured load of the preconfigured device 14. When the power apparatus module provides the energy, the preconfigured device 14 is a load device. While when power apparatus module receives the energy, the preconfigured device 14 is a source device. The power apparatus management system 10 further includes at least one control module 16, and at least one of said at least one control module 16 is configured to transmit at least one control signal to manage at least one of the one or more power apparatuses 12_i_j. In embodiments in accordance with the application, a control module 16 could be implemented with hardware circuit, firmware, software, or any combination thereof, and a processor of any kind (not shown) may be included in the power apparatus management system 10 for performing management of the operations/operating of the power apparatus.

Each of the power apparatus 12_i_j includes a positive terminal 121 and a negative terminal 122. The power apparatus 12_i_j further includes a battery module 123 and a battery module controller 124. The battery module 123 includes one or more batteries, and when the battery module 123 includes a plurality of batteries, the batteries may be configured to electrically couple to each other in serial, in parallel, or in a combination of serial and parallel (not shown). That is, the plurality of batteries could be coupled in serial and/or parallel.

An end of the battery module 123 is electrically coupled to the negative terminal 122. The battery module controller 124 is configured to electrically couple to the battery module 123. The power apparatus 12_i_j further includes a first switch 125 and a second switch 126. Each of the two switches includes three ends, the first end is a control end which determines the on or off status of the switch. When the switch is on, the second end and the third end are short circuits, and when the switch is off, the second end and the third end are open circuits. The first end of the first switch 125 is electrically coupled to the battery module controller 124, the second end of the first switch 125 is electrically coupled to the positive terminal 121, and the third end of the first switch 125 is electrically coupled to the battery module 123. The first end of the second switch 126 is electrically coupled to the battery module controller 124, the second end of the second switch 126 is electrically coupled to the positive terminal 121, and the third end of the second switch 126 is electrically coupled to the negative terminal 122. Wherein there are two electric routes between the positive terminal (the first node) and the negative terminal (the second node) of the power apparatus 12_i_j. One is the enable route ER that flows through the battery module 123, the other is the bypass route BR that does not flow through the battery module 123.

Under the normal use, only one switch is on and the other switch is off. Under the situation that the switch of the enable route ER is on and the switch of the bypass route BR is off, the power apparatus 12_i_j is in the enable mode that could provide energy (preconfigured load) to the preconfigured device 14 or could receive energy (preconfigured load) from the preconfigured device 14. On the other hand, if the switch of the bypass route BR is on and the switch of the enable route ER is off, then the power apparatus 12_i_j is in the bypass mode that is unable to provide energy (preconfigured load) to the preconfigured device 14 or unable to receive energy (preconfigured load) from the preconfigured device 14.

Please refer to FIG. 1 and FIG. 3, the battery module controller 124 is configured to sense an enable route current Ien that flows through the enable route ER and a bypass route current Iby that flows through the bypass route BR, and control a driving of the first switch 125 and a driving of the second switch 126 by using hybrid control mechanism which combines a negative feedback control and an open loop control. The battery module controller 124 performs a current switching between an enable mode and a bypass mode of the power apparatus, based on a mode switching signal of said at least one control signal that received, the enable route current and the bypass route current. The enable mode uses the power apparatus 12_i_j and the bypass mode bypasses the power apparatus 12_i_j. In an embodiment in accordance with the application, the current switching between the enable mode and the bypass mode of the power apparatus 12_i_j may be performed in a continuous and progressive manner. It is understood, in the embodiments in accordance with the application, the control module 16 may be implemented by hardware circuit, or be implemented by firmware or software.

If the power apparatus management system 10 determines to switch the operation of the power apparatus 12_i_j from the enable mode to the bypass mode. The switch of enable route ER, that is the first switch 125, will be finally operated from on to off status, and the switch of bypass route BR, that is the second switch 126, will be finally operated from off to on status. The process of the switching could be called the "transient of bypass-to-enable mode". While if the power apparatus management system 10 determines to switch the operation of the power apparatus 12_i_j from the bypass mode to the enable mode. The switch of bypass route BR, that is the second switch 126, will be finally operated from on to off status, and the switch of enable route ER, that is the first switch 125, will be finally operated from off to on status. The process of the switching could be called the "transient of bypass-to-enable mode".

In an embodiment in accordance with the application, the one or more power apparatuses 12_i_j may be configured to be reconfigurable and when the power apparatus management system having a plurality of power apparatuses, the plurality of power apparatuses may be configured to electrically couple to each other in serial and/or in parallel into a reconfigurable battery module array. In the presented embodiments, the first switch 125 and the second switch 126 may be implemented but is not limited to using at least one transistor, such as Metal-Oxide-Semiconductor Field-Effect Transistor (i.e. MOSFET), or Insulated Gate Bipolar Transistor (i.e. IGBT), etc. In an embodiment in accordance with the application, the switches 125 and 126 may be implemented by using a power MOS.

Take the embodiment of FIG. 2 as an example, when the power apparatus module 12 includes a plurality of power apparatuses 12_i_j that are electrically coupled in serial and/or in parallel with each other, the negative terminals 122 of the power apparatuses 12_1_1, 12_1_2, . . . and 12_1_m are configured to electrically couple in serial and/or in parallel with a ground 18, and the positive terminals 121 of the power apparatuses 12n_1, 12_n_2, . . . and 12_n_m are configured to electrically couple in serial and/or in parallel with the preconfigured device 14, to provide and/or receive a preconfigured load. And the positive terminals 121 of the power apparatuses 12_1_1, 12_1_2, . . . , 12_1_m, . . . , 12_n-1_1, 12_n-1_2, . . . , 12_n-1_m are configured to electrically couple in serial and/or in parallel with the negative terminal 122 of at least one of another power apparatus, and the negative terminals 122 of the power apparatuses 12_n_1, 12_n_2, . . . , 12 nm, . . . , 12_2_1, 12_2_2, . . . , 12_2_m are configured to electrically couple in serial and/or in parallel with the positive terminal 121 of at least one other in serial and/or in parallel to the preconfigured device 14, the negative terminals 122 of a first portion of the plurality of power apparatuses are configured to electrically couple in serial and/or in parallel to the positive terminals of a second portion of the plurality power apparatus. It is understood from the aforementioned embodiments, the positive terminals 12 of the first portion of the plurality of power apparatuses are configured to electrically couple of power apparatuses, and wherein the negative terminals 122 of the second portion of the plurality of power apparatuses are configured to electrically couple in serial and/or in parallel to the positive terminals 121 of a third portion of the plurality of power apparatuses, the negative terminals 122 of the third portion of the plurality of power apparatuses are configured to electrically couple in serial and/or in parallel to a ground 18.

Referring back to FIG. 3, for simplifying the description, the embodiment of the power apparatus module 12 including a single power apparatus 12_i_j is taken as an example to further explain possible implementations. The voltage difference between positive terminal 121 and negative terminal 122 is Vmodule (we called the voltage of the power apparatus), and the current flows through the power apparatus 12 is Imodule. The power apparatus 12_i_j includes a positive terminal 121, a negative terminal 122, a battery module 123, a battery module controller 124, a first switch 125 and a second switch 126. The exemplary embodiments of electrical coupling relationship of the aforesaid elements have been described in the preceding paragraph, and it is not repeated again.

In an embodiment in accordance with the application, the positive terminal 121 is configured to provide and/or receive the preconfigured load. In another embodiment, the negative terminal 122 is configured to electrically couple to a ground. In an embodiment of the application, the positive terminal 121 is configured to electrically couple to the negative terminal 122 of at least one of another power apparatus. In a further embodiment, the negative terminal 122 is configured to electrically couple to the positive terminal 121 of at least one of another power apparatus.

The battery module controller 124 is configured to sense the enable route current Ien flowing through the enable route ER and the bypass route current Iby flowing through the bypass route BR. The battery module controller 124 controls a driving of the first switch 121 and a driving of the second switch 122 by using hybrid control mechanism which combines a negative feedback control and an open loop control, to perform a current switching between an enable route and a bypass route of the single power apparatus 12_i_j, based on a mode switching signal of a control signal that received. In an embodiment, when the battery module controller 124 receives a mode switching signal 161 (i.e. Im flows from ER to BR or flows from BR to ER), knows it's time to reconfigure the power apparatus 12_i_j. For example, if the signal 161 indicates to reconfigure power apparatus 12_i_j from enable mode to bypass mode, the current switching scheme make sure that since Im flows in ER initially, but will flow in BR in the end, and vice versa, meanwhile the Vmodule is change from the battery module voltage to zero and vice versa.

In an embodiment of the application, the battery module controller 124 may include a sensing unit 1241 configured to sense the enable route current Ien and the bypass route current Iby, and generate the power apparatus load current Im to be stored in the storage unit 1245 by adding the enable route current Ien and the bypass route current Iby. In an embodiment in accordance with the application, a detection may be performed periodically and/or upon receiving a mode switching signal 161. The battery module controller 124 may further include a signal processing circuit 1242 with the gain Rfb, which is configured to determine a negative feedback control signal Vfb, based on the power apparatus load current Im detected by the sensing unit 1241, the enable route current Ien and the bypass route current Iby.

The battery module controller 124 further includes an open loop control circuit 1243, a switch driving circuit (switch driver) 1244, and a pull high/pull low circuit 1247. The open loop control circuit 1243 is configured to determine an open loop control signal Vop based on a gain Rop and the power apparatus load current Im. The negative feedback control signal Vfb and the open loop control signal Vop, Combined the Vop and the Vfb, the hybrid control input Vop+Vfb of the switch driving unit 1244 and having the Im current switching from ER to BR (or from BR to ER) continuously and gradually. The output of the switch driving circuit 1244, generate a first switch driving voltage Vdrive,en for the driving of the first switch 125 and generate a second switch driving voltage Vdrive,by for the driving of the second switch 126. Thus the driving of the first switch and the second switch is based on the negative feedback control signal and the open loop control signal at the same time.

For example, now we want to reconfigure power apparatus 12 from enable mode to bypass mode, as mentions before, the current switching scheme is based on the hybrid control mechanism which combines the negative feedback control and the open loop control. Then the battery module controller 124 senses the Ien、Iby and add them to get the strength of the Imodule, i.e. Im, then stores Im in the storage unit 1245. Firstly, according to the Im, which is the input of open-loop control unit 1243, the output of open loop control circuit 1243 is the gain product of Im*Rop=Vop. Vop is the strength of open-loop control. Secondly, since we know the Ien, Iby and Im separately from the sensing module 1246, which feeds the output of (Im−Iby) to the signal processing circuit 1242, the output of the signal processing circuit 1242 is the gain product of (Im−Iby)*Rfb=Vfb. Vfb is the strength of negative feedback-control. Combined the Vop and the Vfb, the hybrid control input Vop+Vfb of the switch driving circuit 1244 make sure the Im current switching from ER to BR continuously and gradually. After the completion of the current switching, the pull-high/pull-low circuit 1247 will fully turn off the ER path switch, the first switch 125 and fully turn on the BR path switch, the second switch 124. The Vmodule initially is equal to battery module voltage now will be zero voltage. The reconfigure procedure of the power apparatus 12_i_j from the bypass mode to enable mode is much the same as above as long as we exchange the role of Iby and Ien in the current switching scheme and the role of battery module voltage and zero voltage in the voltage switching scheme.

In an embodiment in accordance with the application, a mathematical polynomial function of the negative feedback control signal Vfb and the open loop control signal Vop could be used to generate the first switch driving voltage Vdrive,en and the second switch driving voltage Vdrive,by. In the mathematical function, different negative constant(s) and open loop constant(s) may be preconfigured, depending on the application and the type of the switch elements.

In an embodiment in accordance with the application, the signal processing circuit 1242 subtracts the bypass route current Iby from the power apparatus load current Im to output the feedback control signal Vfb, if the mode switching signal 161 indicates a switching from the enable mode to the bypass mode. While, the signal processing circuit 1242 subtracts the enable route current Ien from the power apparatus load current Im to output the feedback control signal Vfb, if the mode switching signal 161 indicates switching from the bypass mode to the enable mode. In an embodiment of the application, the open loop control unit 1243 may obtain the stored value Im from a storage unit 1245, and after the process of the gain Rop, the open loop control unit 1243 may generate the open loop control signal Vop.

Figure 4:
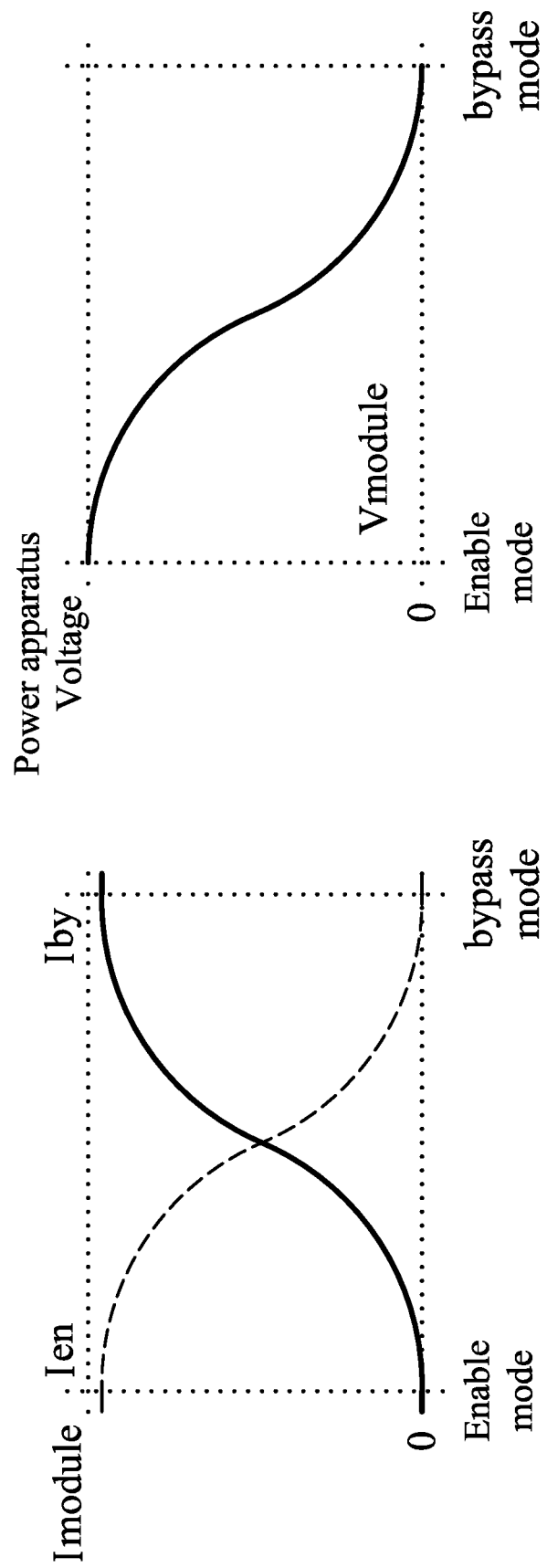
FIG. 4 shows a schematic diagram of the transient variation of current and the transient variation of voltage when a power apparatus is switching between the enable and the bypass modes according to an embodiment of the application.

The equivalent resistance of the first switch 125 on the enable route ER is Ren, the equivalent resistance of the second switch 126 on the bypass route BR is Rby, and the voltage of the power apparatus 12_i_j is Vmodule as mentioned before. Refer to the FIG. 4, which shows a schematic diagram of the transient variation of current and the transient variation of voltage during a power apparatus performs the switching between the enable mode and the bypass mode according to an embodiment of the application, wherein the left drawing of FIG. 4 shows the transient variation of current, while the right drawing of FIG. 4 shows the transient variation of voltage. When the power apparatus performs the switching from the enable mode to the bypass mode, the transferring of current and the transferring of voltage may be seen from the FIG. 4 in a direction from left to right. On the contrary, when the power apparatus performs the switching from the bypass mode to the enable mode, the transferring of current and the transferring of voltage may be seen from the FIG. 4 in a direction from right to left.

In the enable mode, the operation voltage Vdrive,en of the first switch 125 is the maximum operation voltage Vmax, and the operation voltage Vdrive.by of the second switch 126 is the minimum operation voltage Vmin. In an embodiment of the application, when the power apparatus performs the switching from the enable mode to the bypass mode, it may control the resistance Ren getting bigger progressively and the resistance Rby getting smaller progressively. In accordance with the current split principle of $$Iby = Im \times \frac{Ren}{Rby + Ren},$$

due to the resistance Ren is getting bigger, consequently the current Iby is getting bigger, and in accordance with the current split principle of $$Ien = Im \times \frac{Rby}{Rby + Ren},$$

due to the resistance Rby is getting smaller, consequently the current Ien is getting smaller. During the switching process, in accordance with an embodiment of the application, the power apparatus current Imodule may be controlled to flow slowly from Ien to Iby. The current switching between the modes is accomplished when the current Ien all flows into the current Iby.

In the bypass mode, the operation voltage Vdrive,by of the second switch 126 is the maximum voltage Vmax, the operation voltage Vdrive,en of the first switch 125 is the minimum voltage Vmin. In an embodiment of the application, when the power apparatus performs the switching from the bypass mode to the enable mode, it may control the resistance Rby getting bigger progressively and the resistance Ron getting smaller progressively. In accordance with the current split principle of $$Ien = Im \times \frac{Rby}{Rby + Ren},$$

due to the resistance Rby is getting bigger, consequently the current Ien is getting bigger, and in accordance with the current split principle of $$Iby = Im \times \frac{Ren}{Rby + Ren},$$

due to the resistance Ren is getting smaller, consequently the current Iby is getting smaller. During the switching process, in accordance with an embodiment of the application, the power apparatus current Imodule may be controlled to flow slowly from Iby to Ien. The current switching between the modes is accomplished when the current Iby all flows into the current Ien. In an embodiment of the application, the current switching transient in between the enable mode and the bypass mode of the power apparatus may be performed in a continuous and progressive manner.

In an embodiment of the application, the sensing unit 1241 may further include a sensing module 1246 configured to sense and/or monitor the enable route current Ien and the bypass route current Iby. When sensing the current switching between the modes is accomplished, the sensing module 1246 transmits at least one signal to a pull high/pull low circuit 1247. The switch driving circuit 1244 is configured to electrically coupled to the pull high/pull low circuit 1247, which controls the switch driving circuit 1244, to drive the first switch to fully off and the second switch to fully on, or to drive the first switch to fully on and the second switch to fully off, until the voltage switching between the modes is accomplished.

In an embodiment of the application, the sensing unit 1241 may further store the power apparatus load current Im by a storage unit 1245, and the open loop control circuit 1243 may be configured to receive the power apparatus load current Im from the storage unit.

The application will become more understood. In an embodiment of the application, the battery module controller 124 may be configured to include a processing unit (not shown), which triggering all related operation(s) for the aforementioned mode switching of the power apparatus described in the preceding paragraphs, while receiving the mode switching signal 161. In another embodiment of the application, such as shown in the FIG. 3, the mode switching signal may be transmitted to units 1241, 1243 and 245 and circuits 1242, 1244 and 1247 to trigger the aforementioned mode switching of the power apparatus described in the preceding paragraphs. While the scope of the application is not limited thereto. Furthermore, in an embodiment, the sensing unit 1241 may also be configured to actively monitor and sensing the enable route current Ien and the bypass route current Iby.

It could be understood that each of the elements or modules in the presented embodiments may be a device having a corresponding function, which may have the appropriate hardware circuits or elements to perform the corresponding function, however, the device is not limited to an entity device, which may also be a device having capabilities for processing and running the program codes and software(s) with respective functions. The manner of operations of the respective elements may further refer to the following description of the methods.

Figure 5:
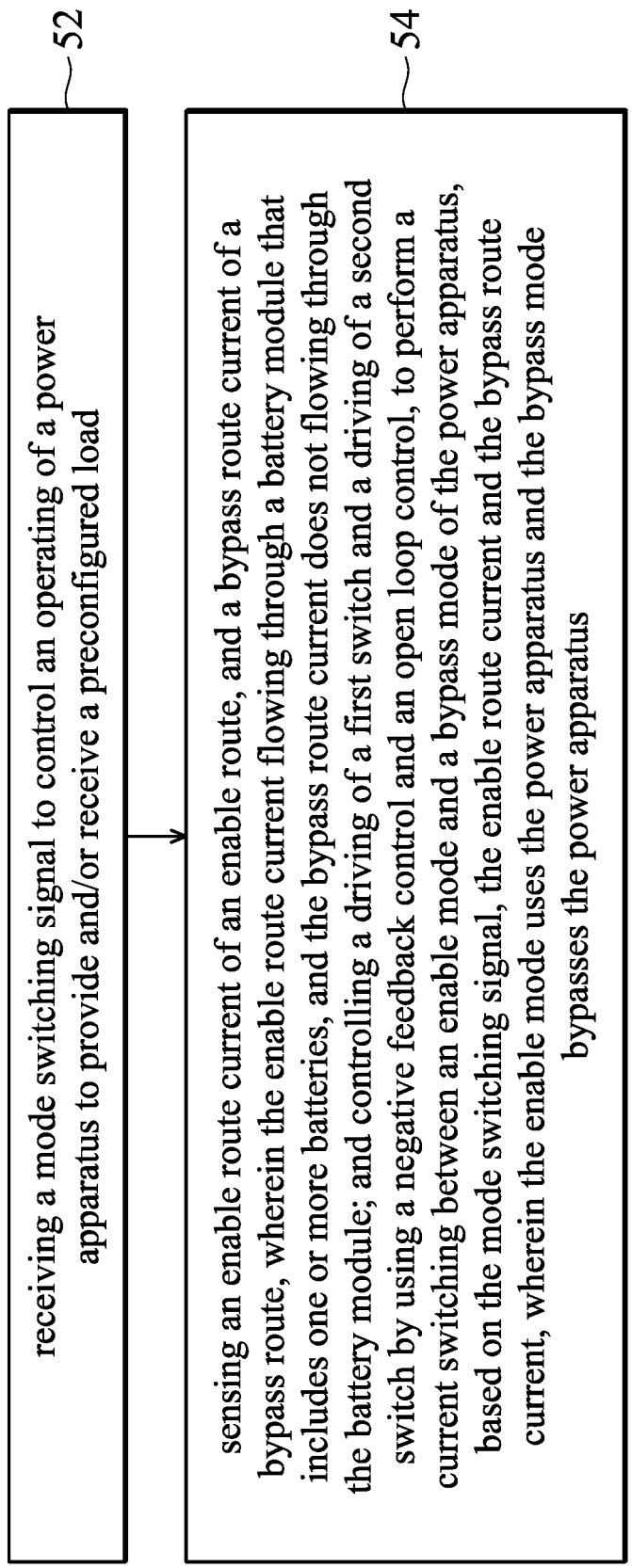
Figure 6:
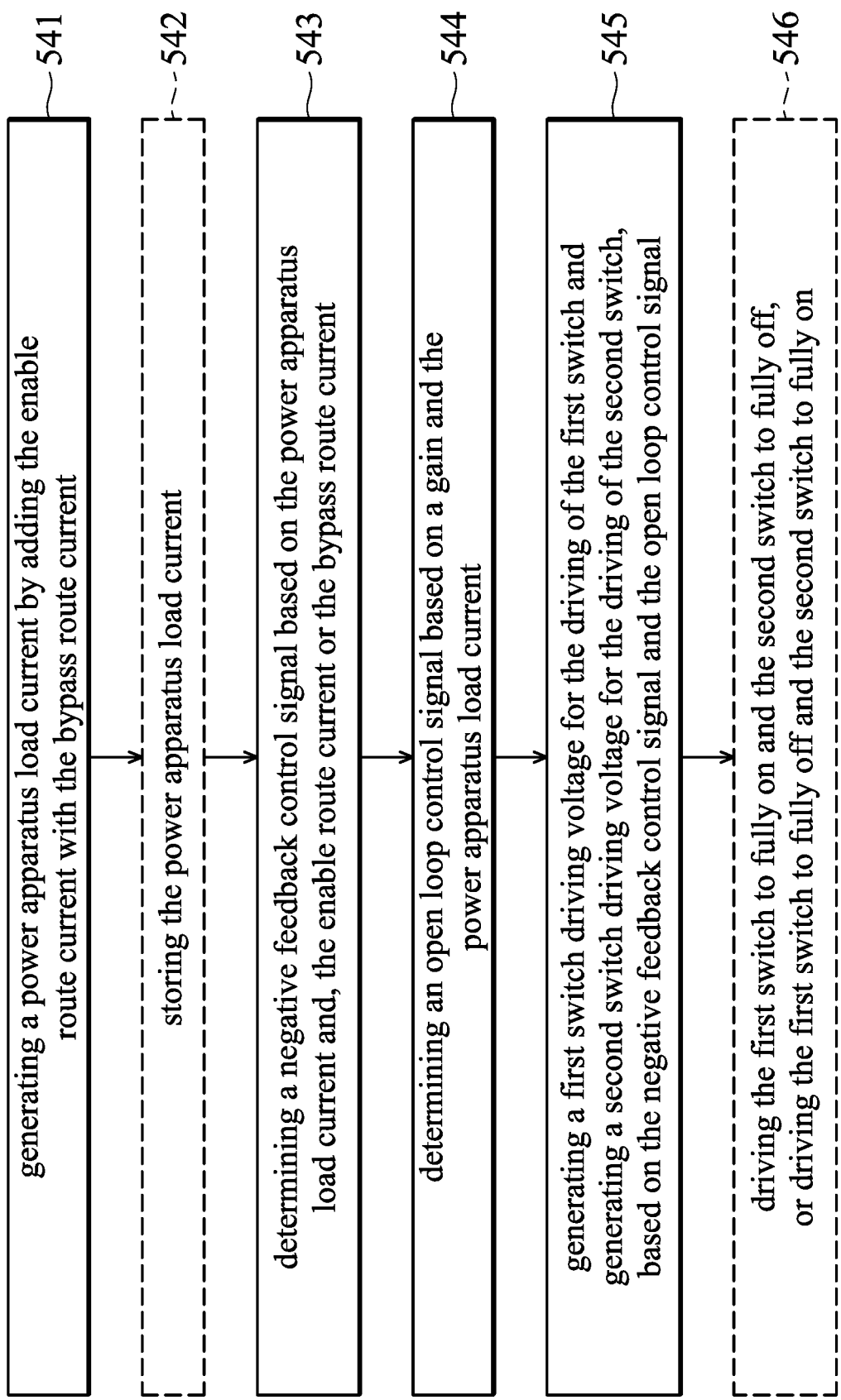

FIGS. 5-7 show flowcharts of a power apparatus operating method according to embodiments of the application. As shown in FIG. 5, a power apparatus operating method will be described in detail with reference to the block 52 and the block 54. The method, as shown in block 52, receives a mode switching signal to control the operating of the power apparatus to provide and/or receive a preconfigured load. As shown in block 54, the method senses an enable route current of an enable route flowing through a battery module that includes one or more batteries and a bypass route current of a bypass route not flowing through the battery module. The method controls a driving of a first switch and a driving of a second switch by the hybrid control mechanism which combines a negative feedback control and an open loop control, to perform a current switching between an enable mode and a bypass mode of the power apparatus, based on the mode switching signal, the enable route current and the bypass route current, wherein the enable mode uses the power apparatus, while the bypass mode bypasses the power apparatus. In an embodiment of the application, the current switching transient in between the enable mode and the bypass mode of the power apparatus may be performed in a continuous and progressive manner.

In an embodiment of the application, as shown in FIG. 6, the power apparatus operating method may further perform operations shown in blocks 541, and 543-545. The method generates a power apparatus load current by adding the enable route current with the bypass route current (as shown in block 541). The method, as shown in the block 543, determines a negative feedback control signal based on the power apparatus load current, the enable route current and the bypass route current. As shown in the block 544, the method determines an open loop control signal based on a gain and the power apparatus load current. And as shown in the block 545, the method generates a first switch driving voltage for driving the first switch and generates a second switch driving voltage for driving the second switch, based on the negative feedback control signal and the open loop control signal. Furthermore, in an embodiment of the application, the method may selectively store the power apparatus load current, as shown in block 542). In another embodiment of the application, as shown in block 546, the method may drive the first switch to fully off and the second switch to fully on, or drive the first switch to fully on and the second switch to fully off.

As shown in block 5431, refer to FIG. 7, another embodiment of the application, when the method determine the negative feedback control signal, it may subtract the bypass route current from the power apparatus load current to form the feedback control signal, if the mode switch signal indicates switching from the enable mode to the bypass mode; and subtract the enable route current from the power apparatus load current to form the feedback control signal, if the mode switch signal indicates switching from the bypass mode to the enable mode.

While the application has been described by way of example and in terms of exemplary embodiments, it is to be understood that the application is not limited thereto. Those who are skilled in this technology may still make various alterations and modifications without departing from the scope and spirit of this application. Therefore, the scope of the present application shall be defined and protected by the following claims and their equivalents.

What is claimed is:
1. A power apparatus management system, comprising:
a power apparatus module, including one or more power apparatuses, and being configured to provide and/or receive a preconfigured load of a preconfigured device; and at least one control module, configured to transmit at least one control signal to manage operations of at least one of the one or more power apparatuses, with each power apparatus comprising:
a positive terminal and a negative terminal;
a battery module, comprising one or more batteries, and being configured to electrically couple to the negative terminal;
a battery module controller, configured to electrically couple to the battery module; and
a first switch and a second switch, wherein each of the first switch and the second switch has a first end, a second end and a third end, with the first end and the second end be respectively electrically coupled to the battery module controller and the positive terminal, the third end of the first switch electrically coupled to the battery module and the third end of the second switch electrically coupled to the negative terminal;
wherein between the positive terminal and the negative terminal, there are an enable route flowing through the battery module and a bypass route not flowing through the battery module, and
the battery module controller is configured to:
sense an enable route current flowing through the enable route and a bypass route current flowing through the bypass route; and
control a driving of the first switch and a driving of the second switch by using a negative feedback control and an open loop control, to perform a current switching between an enable mode and a bypass mode of the at least one of the one or more power apparatuses, based on a mode switching signal of said at least one control signal that received, the enable route current and the bypass route current, wherein the enable mode uses the at least one of the one or more power apparatuses and the bypass mode bypasses the at least one of the one or more power apparatuses.

2. The power apparatus management system of claim 1, wherein each of the one or more power apparatuses is configured to be a reconfigurable power apparatus, and wherein when the power apparatus management system includes a plurality of power apparatuses, the plurality of power apparatuses are configured to electrically couple to each other in serial, in parallel, or a combination of in serial and in parallel.

3. The power apparatus management system of claim 2, wherein the positive terminals of a first portion of the plurality of power apparatuses are configured to electrically couple in serial and/or in parallel to the preconfigured device, the negative terminals of the first portion of the plurality of power apparatuses are configured to electrically couple in serial and/or in parallel to the positive terminals of a second portion of the plurality of power apparatuses, and wherein the negative terminals of the second portion of the plurality of power apparatuses are configured to electrically couple in serial and/or in parallel to the positive terminals of a third portion of the plurality of power apparatuses, the negative terminals of the third portion of the plurality of power apparatuses are configured to electrically couple in serial and/or in parallel to a ground.

4. The power apparatus management system of claim 1, wherein the first switch and the second switch are implemented with at least one transistor.

5. The power apparatus management system of claim 1, wherein the current switching between the enable mode and the bypass mode in a continuous and progressive manner.

6. The power apparatus management system of claim 1, wherein the battery module controller further comprises:
a sensing circuit, configured to sense the enable route current and the bypass route current, and output a power apparatus load current by adding the enable route current with the bypass route current;
a signal processing circuit, configured to determine a negative feedback control signal based on the power apparatus load current, the enable route current and the bypass route current;
an open loop control circuit, configured to determine an open loop control signal based on a gain and the power apparatus load current; and
a switch driving circuit, configured to generate a first switch driving voltage for the driving of the first switch and generate a second switch driving voltage for the driving of the second switch, based on the negative feedback control signal and the open loop control signal.

7. The power apparatus management system of claim 6, wherein the sensing circuit further stores the power apparatus load current by a storage unit, and the open loop control circuit is configured to receive the power apparatus load current from the storage unit.

8. The power apparatus management system of claim 6, wherein the signal processing circuit subtracts the bypass route current from the power apparatus load current to output the negative feedback control signal, if the mode switch signal indicates switching from the enable mode to the bypass mode, while the signal processing circuit subtracts the enable route current from the power apparatus load current to output the negative feedback control signal, if the mode switch signal indicates switching from the bypass mode to the enable mode.

9. The power apparatus management system of claim 6, wherein the battery module controller further comprises a pull high/pull low circuit which controls the switch driving circuit, to drive the first switch to fully off and the second switch to fully on, or to drive the first switch to fully on and the second switch to fully off.

10. A power apparatus, configured to provide and/or receive a preconfigured load, comprising:
a positive terminal and a negative terminal;
a battery module, comprising one or more batteries, and being configured to electrically couple to the negative terminal;
a battery module controller, configured to electrically couple to the battery module;
a first switch and a second switch, wherein each of the first switch and the second switch has a first end, a second end and a third end, with the first end and the second end be respectively electrically coupled to the battery module controller and the positive terminal, the third end of the first switch electrically coupled to the battery module and the third end of the second switch electrically coupled to the negative terminal;
wherein between the positive terminal and the negative terminal, there are an enable route that flows through the battery module and a bypass route that does not flow through the battery module, and
the battery module controller is configured to:
sense an enable route current flowing through the enable route and a bypass route current flowing through the bypass route; and
control a driving of the first switch and a driving of the second switch by using a negative feedback control and an open loop control, to perform a current switching between an enable mode and a bypass mode of the power apparatus, based on a mode switching signal that received, the enable route current and the bypass route current, wherein the enable mode uses the power apparatus and the bypass mode bypasses the power apparatus.

11. The power apparatus of claim 10, wherein the power apparatuses is configured to be reconfigurable.

12. The power apparatus of claim 10, wherein the positive terminal is configured to provide and/or receive the preconfigured load.

13. The power apparatus of claim 10, wherein the negative terminal is configured to electrically couple to a ground.

14. The power apparatus of claim 10, wherein the positive terminal is configured to electrically couple to a negative terminal of at least one of another power apparatus.

15. The power apparatus of claim 10, wherein the negative terminal is configured to electrically couple to a positive terminal of at least one of another power apparatuses.

16. The power apparatus of claim 10, wherein the current switching between the enable mode and the bypass mode in a continuous and progressive manner.

17. The power apparatus of claim 10, wherein the battery module controller further comprises:
a sensing circuit, configured to sense the enable route current and the bypass route current, and output a power apparatus load current by adding the enable route current with the bypass route current;
a signal processing circuit, configured to determine a negative feedback control signal based on the power apparatus load current, the enable route current and the bypass route current;
an open loop control circuit, configured to determine an open loop control signal based on a gain and the power apparatus load current; and
a switch driving circuit, configured to generate a first switch driving voltage for the driving of the first switch and generate a second switch driving voltage for the driving of the second switch, based on the negative feedback control signal and the open loop control signal.

18. The power apparatus of claim 17, wherein the sensing circuit further stores the power apparatus load current by a storage unit, and the open loop control circuit is configured to receive the power apparatus load current from the storage unit.

19. The power apparatus of claim 17, wherein the signal processing circuit subtracts the bypass route current from the power apparatus load current to output the negative feedback control signal, if the mode switch signal indicates switching from the enable mode to the bypass mode, while the signal processing circuit subtracts the enable route current from the power apparatus load current to output the negative feedback control signal, if the mode switch signal indicates switching from the bypass mode to the enable mode.

20. The power apparatus of claim 17, wherein the battery module controller further comprises a pull high/pull low circuit which controls the switch driving circuit, to drive the first switch to fully off and the second switch to fully on, or to drive the first switch to fully on and the second switch to fully off.

21. A power apparatus operating method, comprising:
receiving a mode switching signal to control an operating of a power apparatus to provide and/or receive a preconfigured load;
sensing an enable route current of an enable route, and a bypass route current of a bypass route, wherein the enable route current flowing through a battery module that includes one or more batteries, and the bypass route current does not flowing through the battery module; and
controlling a driving of a first switch and a driving of a second switch by using a negative feedback control and an open loop control, to perform a current switching between an enable mode and a bypass mode of the power apparatus, based on the mode switching signal, the enable route current and the bypass route current, wherein the enable mode uses the power apparatus and the bypass mode bypasses the power apparatus.

22. The power apparatus operating method of claim 21, wherein the current switching between the enable mode and the bypass mode in a continuous and progressive manner.

23. The power apparatus operating method of claim 21, further comprising:
generating a power apparatus load current by adding the enable route current with the bypass route current;
determining a negative feedback control signal based on the power apparatus load current, the enable route current and the bypass route current;
determining an open loop control signal based on a gain and the power apparatus load current; and
generating a first switch driving voltage for the driving of the first switch and generating a second switch driving voltage for the driving of the second switch, based on the negative feedback control signal and the open loop control signal.

24. The power apparatus operating method of claim 23, further comprising:
subtracting the bypass route current from the power apparatus load current to form the negative feedback control signal, if the mode switch signal indicates switching from the enable mode to the bypass mode; and
subtracting the enable route current from the power apparatus load current to form the negative feedback control signal, if the mode switch signal indicates switching from the bypass mode to the enable mode.

25. The power apparatus operating method of claim 23, further comprising:
driving the first switch to fully on and the second switch to fully off, or driving the first switch to fully off and the second switch to fully on.

26. The power apparatus operating method of claim 23, further comprising:
storing the power apparatus load current.

* * * * *